Oct. 24, 1967     A. S. FENSTER ET AL     3,348,475

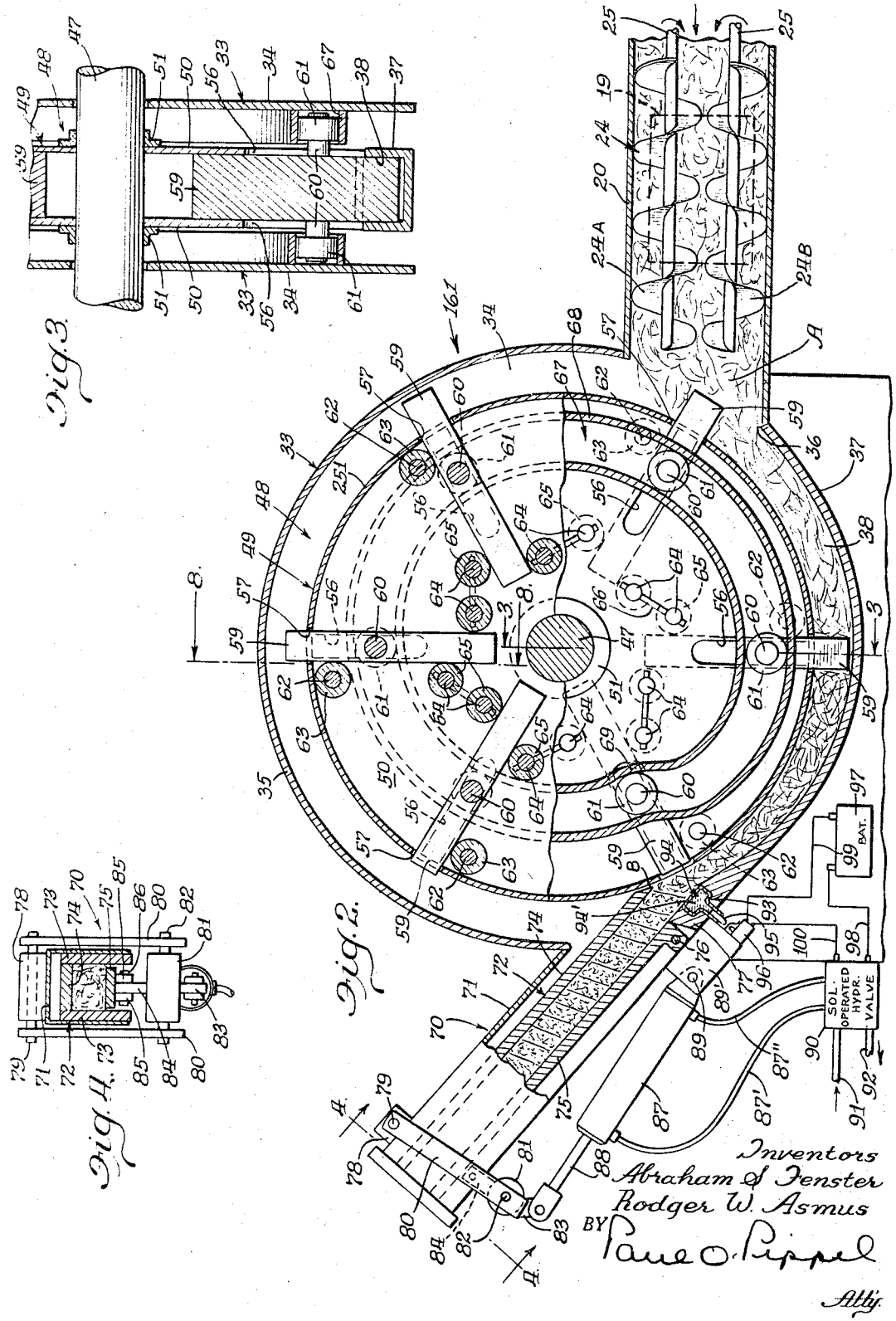

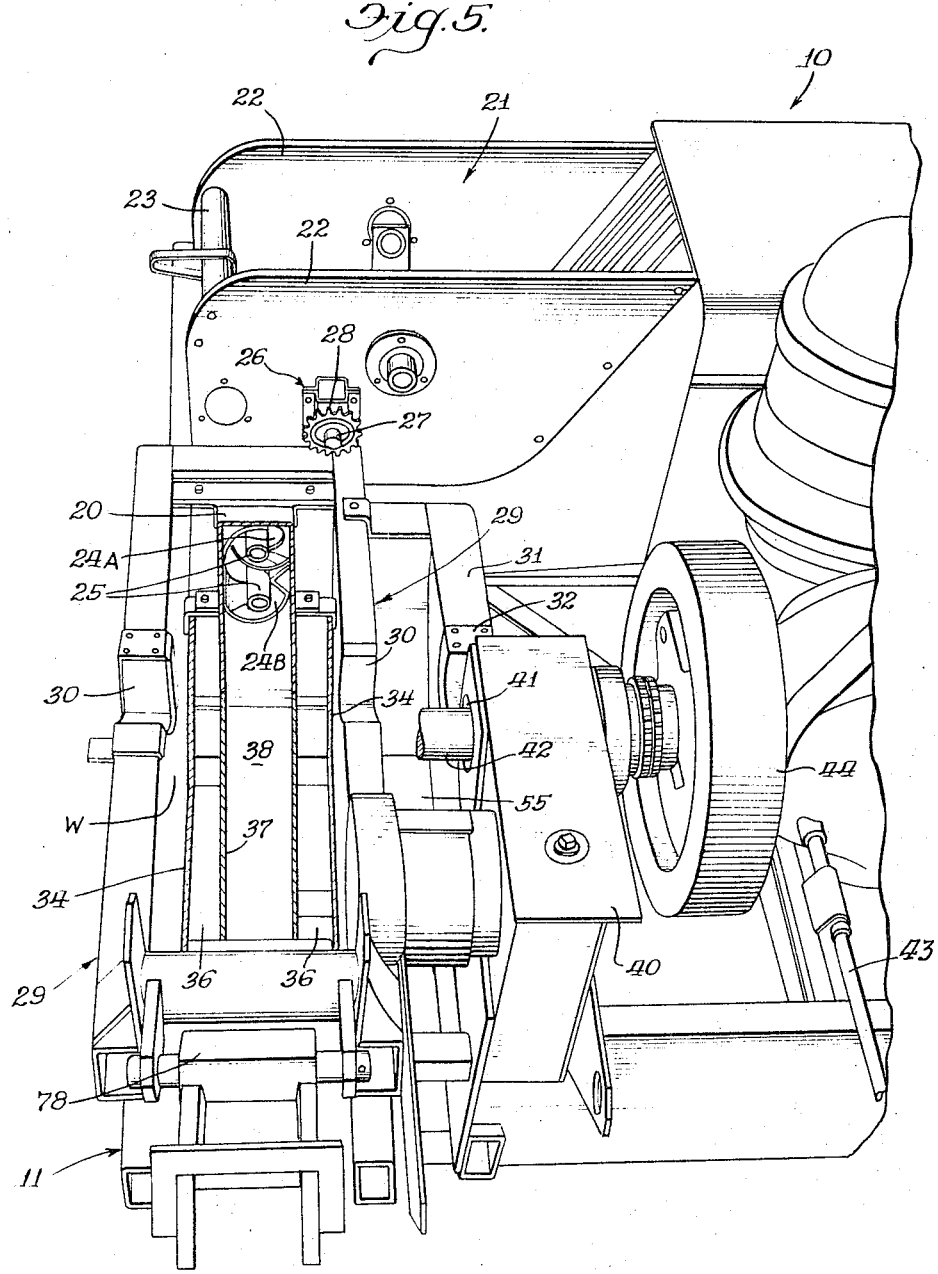

HAY WAFERIZER

Filed Feb. 1, 1966     7 Sheets-Sheet 4

Inventors
Abraham S. Fenster
Rodger W. Asmus
BY Paul O. Pippel
Atty.

Oct. 24, 1967 — A. S. FENSTER ET AL — 3,348,475
HAY WAFERIZER
Filed Feb. 1, 1966 — 7 Sheets-Sheet 5

Inventors
Abraham S. Fenster
Rodger W. Asmus
BY Paul O. Pippel
Atty.

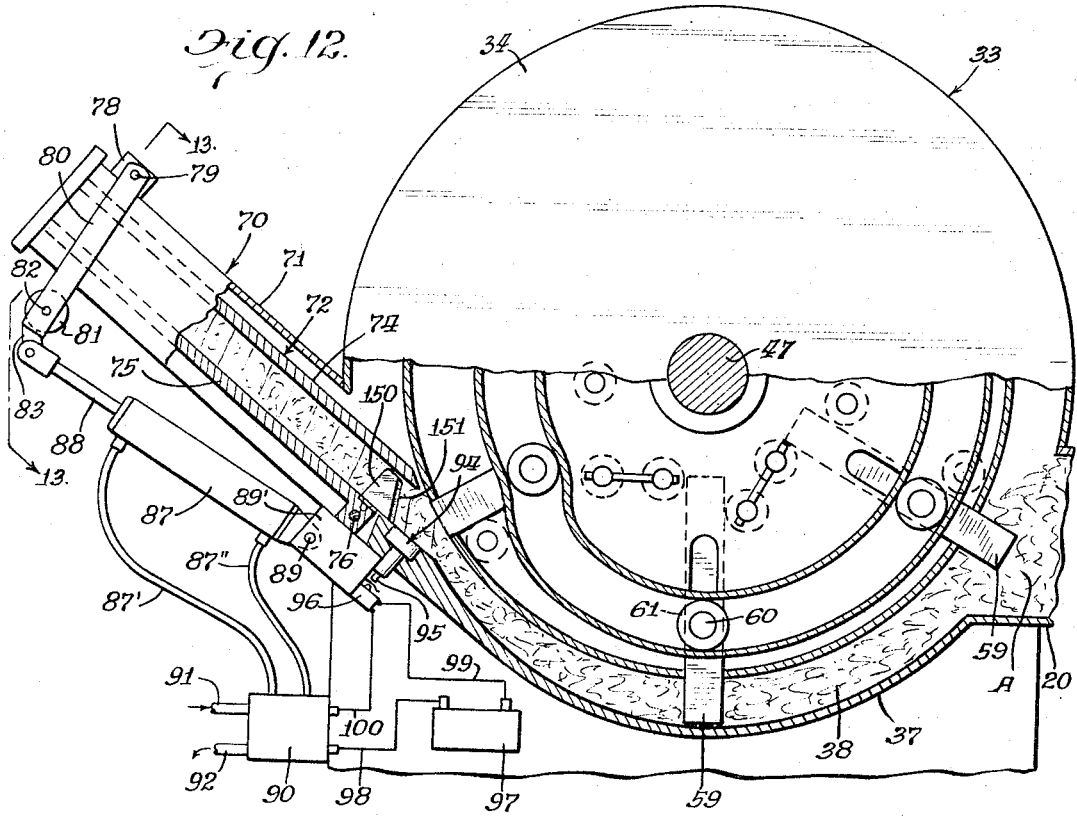
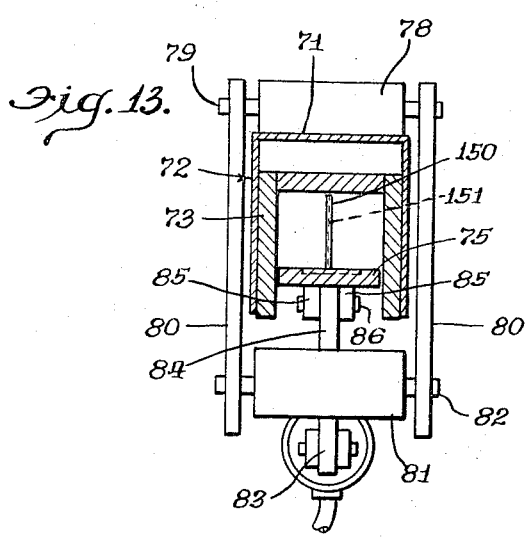
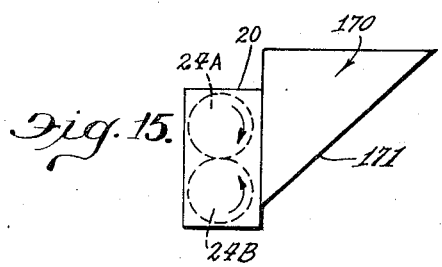

United States Patent Office 3,348,475
Patented Oct. 24, 1967

3,348,475
HAY WAFERIZER
Abraham S. Fenster, West Orange, N.J., and Rodger W. Asmus, Downers Grove, Ill., assignors to International Harvester Company, a corporation of Delaware
Filed Feb. 1, 1966, Ser. No. 532,825
7 Claims. (Cl. 100—177)

ABSTRACT OF THE DISCLOSURE

A three-stage waferizing machine having a first-stage feed unit, a second-stage formation and compaction unit, and a third-stage wafer retention unit. The first-stage unit, includes a pair of counter-rotating augers for feeding hay into the second-stage unit at bale density. The second-stage unit includes a housing in which a vane drum is rotatably mounted, the vane drum having a plurality of vanes which are movable through a compaction zone thereby forming and compacting wafers. The third-stage unit includes an adjustable die located immediately after the second-stage unit and in communication with the compaction zone for receiving wafers therefrom and for maintaining a wafer retention pressure on wafers moving therethrough.

CROSS REFERENCES TO RELATED APPLICATIONS

This application is a continuation-in-part of our co-pending U.S. patent applications No. 142,377 filed October 2, 1961, and No. 419,276 filed December 10, 1964, both now abandoned. The invention described herein pertains to the art of hay waferizating, more particularly, to a three-stage machine for making hay wafers.

BACKGROUND OF THE INVENTION

The trend in hay processing is towards smaller packages of hay, that is, from bales of hay to wafers and pellets. These smaller packages—wafers and pellets—permit a complete mechanization of hay handling operations from windrow to feed bunker. Compared with wafers, however, pellets are less desirable. They are made of chopped hay which requires large amounts of power to chop and has less food value than whole hay. Wafers, which are made of whole hay, require less power to make and ave greater food value than pellets.

Hay is not, however, easily waferized. Windrowed hay, for example, is bulky, requiring that a relatively large volume of hay be handled in producing a single wafer. Individual stems of hay are, furthermore, long, tough, and resilient, causing them to resist compaction and to spring back to their original form on removal of a compressive load. Hay does not, moreover, normally have any significant adhesive properties to enable it to cohere in the form of wafers.

SUMMARY

Our hay waferizer overcomes these negative characteristics of hay in the following ways among others: First, by waferizing hay in three stages—i.e. by first compacting the hay to bale density to reduce its bulk to a condition suitable for waferizing; by then forming the hay of bale density into wafers; and by then holding the wafers under prolonged pressure and subject to the heat of compression so as to impart a "set" to them. Second, by providing an efficient, high speed, high capacity, rotary hay waferizing machine capable of handling large quantities of unchopped hay per unit of time without causing excessive unbalanced forces. Third, by providing a three-stage hay waferizing unit including a first-stage twin auger unit, a second-stage rotary vane compacting unit, and a third-stage discharge die.

DRAWINGS

The best mode contemplated for carrying out our invention is shown in the attached drawings, where:

FIG. 2 is a cross-sectional view of the three-stage waferizing unit used in the machine of FIG. 1, showing the first-stage twin auger unit, the second-stage rotary vane unit, and the third-stage die unit;

FIG. 3 is a cross-sectional view through the second-stage, rotary vane compactor, taken on line 3—3 of FIG. 2;

FIG. 4 is a cross-sectional view through the third-stage die, taken on line 4—4 of FIG. 2;

FIG. 5 is a perspective view of a portion of the machine of FIG. 1, showing the outlet of the first-stage unit and the interior of the second-stage compaction chamber;

FIG. 12 is a view similar to FIG. 2, showing a modified form of the third-stage die unit;

FIG. 13 is a cross-sectional view through the modified third-stage die unit, taken on line 13—13 of FIG. 12;

FIG. 15 is a view showing the feeding hopper.

DESCRIPTION

General details

Figure 1:
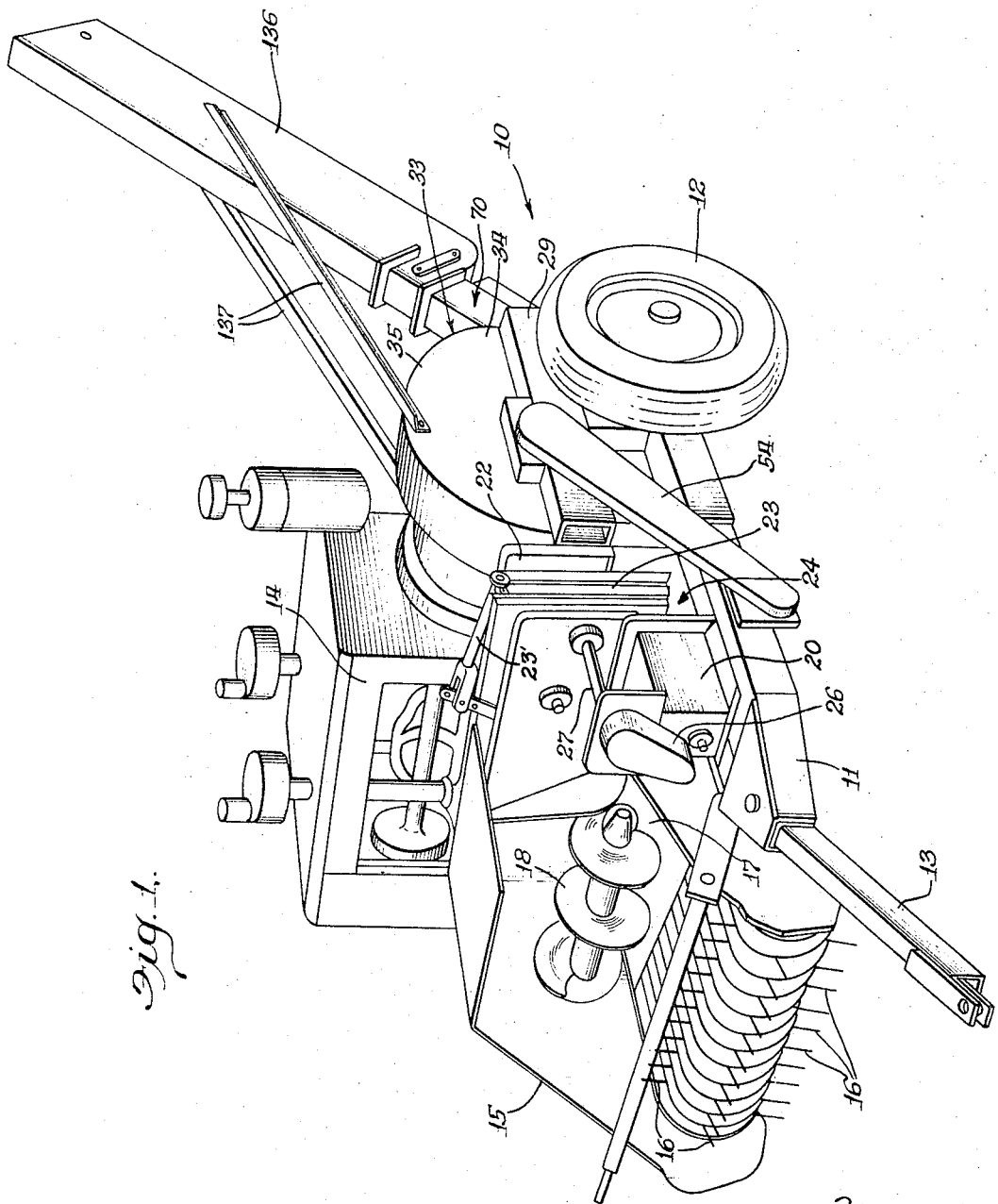
FIG. 1 is a perspective view of our novel three-stage hay waferizing machine.

The hay waferizing machine 10 (FIG. 1) includes a chassis 11 mounted on wheels 12 and a tongue 13 for towing the machine. Located on the chassis are a hay pick-up mechanism 16, a cross feed mechanism 18, a packer finger assembly 23', a first-stage double auger unit 24, a second-stage rotary vane unit 48, a third-stage die unit 70, a discharge conveyor 136, and a prime mover 14.

The hay pick-up, cross feed, and packer finger mechanisms (FIG. 1) are similar to those shown in U.S. Patent No. 2,450,082. In general, tined pick-up mechanism 16 removes hay from the ground and places it on the platform 17. Housing 15 confines the hay on the platform within reach of the cross feed mechanism 18, which moves the hay laterally into the path of packer fingers 23' of packer finger assembly 23. The latter assembly comprises a packing chamber 21 (FIG. 5) between walls 22, and the fingers 23'. These fingers operate on a four-bar principle and sweep the hay through inlet opening 19 (FIG. 2) into the first-stage, double auger unit 24.

The waferizer disclosed herein can be used as a stationary machine as well as a field-traversing machine. In stationary service, the wheels 12, pickup 16, and crossfeed auger 18 are omitted and the waferizer supported instead on a suitable foundation. Hay can be fed to the first stage auger unit 24 by means of a hopper discharging into inlet 19 (FIG. 2) or by means of a force-feed apron conveyor assembly discharging into inlet 19. Such a hopper 170 is illustrated in FIG. 15 and comprises a sloping bottom 171 terminating adjacent the bottom edge of inlet 19, so that the hay tends to gravitate towards inlet 19. The apron conveyor assembly comprises two counter-rotating, endless conveyors, the inside runs of which travel toward inlet 19 and terminate adjacent thereto so as to force feed hay into inlet 19. The upper conveyor of the apron conveyor assembly is yieldably supported so that it may float or move away from the lower conveyor on overload conditions to provide relief. The surfaces of the conveyors should be equipped with cleats or similar devices to provide an aggressive feed of the hay.

*First-stage unit*

The first-stage, double auger unit 24 (FIG. 2) compacts the hay to bale density, that is, to the density of a bale of hay produced by a conventional hay baler. The components of the first-stage unit are the housing 20, the augers 24A, 24B, and a chain drive 168.

Housing 20 encloses and supports auger 24A, 24B. For ease of fabrication, the housing is made rectangular; however, it could be made of oval cross-section. Hay enters the housing through inlet 19 adjacent packer fingers 23' (FIG. 1) and leaves through outlet A leading to the second-stage unit. Outlet A connects to the lower, curved, second-stage channel 37 in a manner to permit a smooth flow of hay from the first-stage unit to the second-stage unit.

The augers 24A and 24B have opposite hand spirals, are timed about 180° apart for better acceptance of hay from packer fingers 23', and are counter-rotating in the direction of the arrows in FIG. 2, to induce hay into the housing 20 through inlet opening 19. Auger shafts 25 are journalled in bearings located in walls of housing 20. The chain drive 168 inside housing 26 and shaft 27 (FIG. 1) transmits power from prime mover 14 to the augers, which are arranged to run at the lowest r.p.m. that will permit maximum intake of raw material.

*Second-stage unit*

Figure 6:
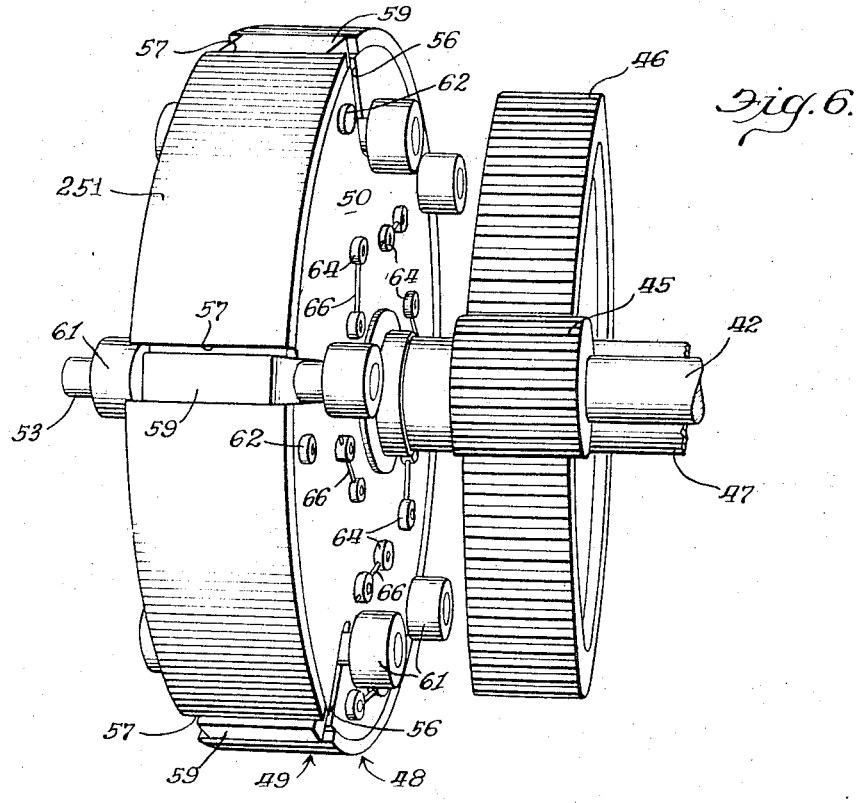
FIG. 6 is a perspective view showing the second-stage rotary vane compacting unit and its drive shaft.

The second stage, rotary vane unit 48 (FIG. 2) in housing 33 (FIG. 1) measures the hay into wafer charges and compacts each charge of hay to wafer density. In general, the second-stage unit 48 comprises a vane drum 49 (FIG. 6) and an enclosure 161 (FIG. 2).

Figure 7:
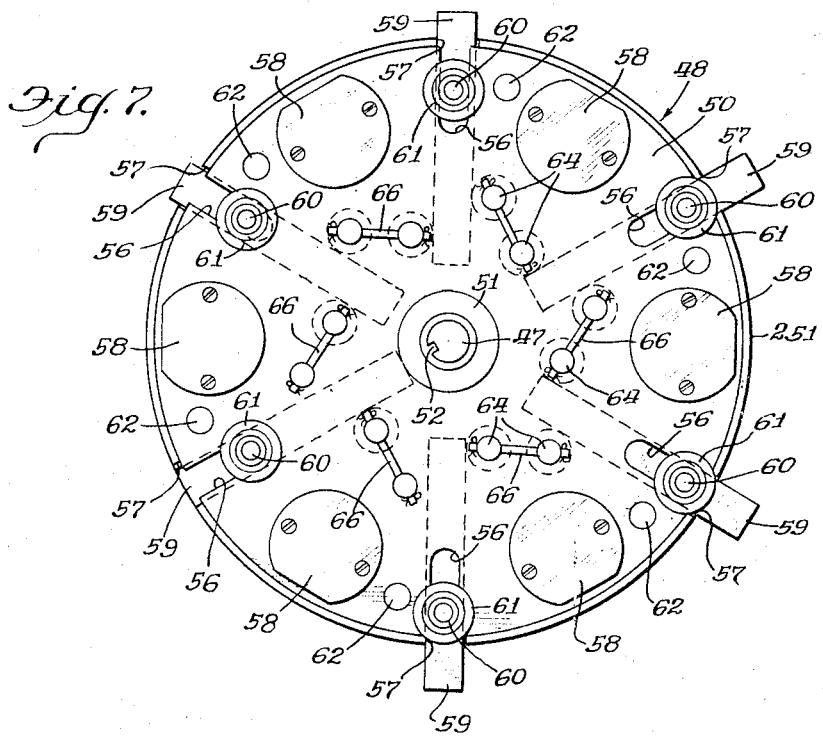
FIG. 7 is a side view of the second-stage compaction unit of FIG. 6.

Vane drum 49 comprises a pair of sleeves 51 (FIG. 3) having attached thereto circular side plates 50. The shell 251 of the drum is formed by a cylindrical plate. Radial vane slots 56 in the side plates and transverse vane slots 57 in the shell 251 accommodate vanes 59 (described below). Hand hole covers 58 (FIG. 7) provide access to the interior of the drum. Sleeves 51 are attached to shaft 47 (FIG. 3), which is journaled in bearings 30 and 32 on support 29 (FIG. 5). Shaft 47 carries a gear 46 (FIG. 6), which is driven by pinion 45 on shaft 42 of the prime mover 14.

The vane assembly comprises a plurality of rectangular block vanes 59 (FIG. 2) radiating from the vane slots 56 and 57 of drum 49. Since the vanes encounter loads of about 30,000 pounds, the vane assembly must be rugged, the vanes of the preferred embodiment being, for example, steel plates 2⅓" thick. The distance separating two adjoining vanes is determined by the amount of bale density hay required to produce a wafer.

Figure 9:
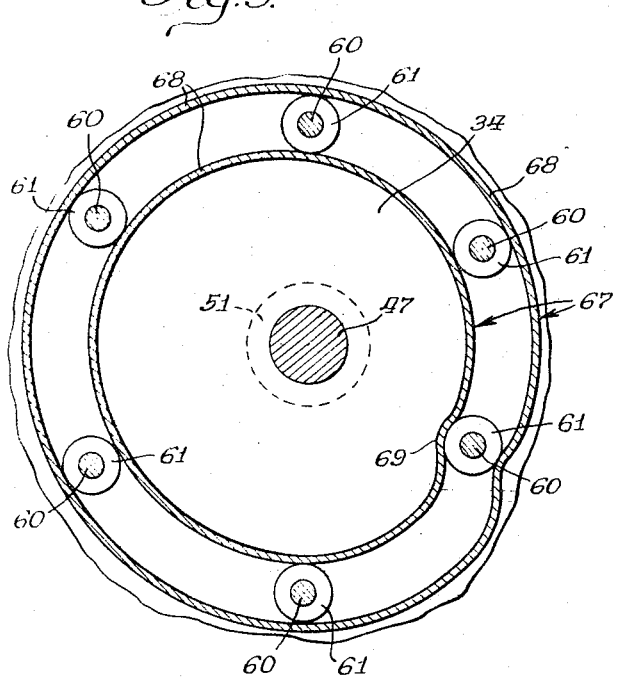
FIG. 9 is a detailed view of one of the cam tracks for reciprocating the vanes of the second-stage compaction unit.
Figure 8:
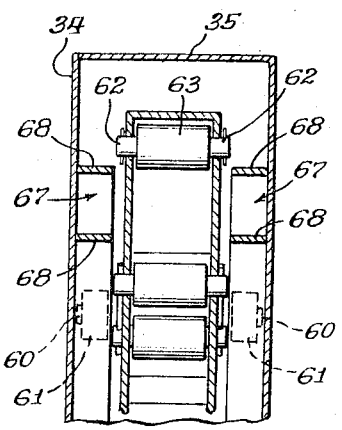
FIG. 8 is a sectional view through the second-stage compaction unit, taken on line 8—8 of FIG. 2.

Each vane is guided by a set of three rollers, comprising an outer roller 63 rotatable on a pin 62 and a pair of inner rollers 65 rotatable on pins 64. Pins 62 (FIG. 7) are press-fitted in side plates 50; pins 64 are secured against lateral and rotational movement by rods 66. In addition to serving as guides, roller 63 and one roller 65 support the vane on its backside, that is, the side away from the hay, and absorb the load imposed on the vane as it waferizes the hay. A reciprocating action is imparted to the vanes by the coaction of rollers 61 and cam track 67. The rollers 61 (FIG. 6) are rotatably mounted on the pins 60 projecting from both sides of each vane 59. Pins 60 slide in the radial vane slots 56, (FIG. 6) which extend through drum 49. The rollers 61 ride in cam track 67 (see FIG. 9 and below). Back-up springs (not shown) may be used to force vanes 59 outward and to cushion the vanes on retraction by cam track 67.

The enclosure 161 for vane drum 49 comprises the well W (FIG. 5) and the housing 33 (FIG. 1), which covers the well. Housing 33 comprises, in turn, a pair of circular walls 34 (FIG. 3) joined together by a semi-cylindrical shell 35. Housing 33 rests on the support 29 (FIG. 5).

An endless cam track 67 (FIGS. 2, 3, 8 and 9) for guiding vane rollers 61 is located on the inside of each wall 34. Track 67 is eccentric to the axis of shaft 47, so that as drum 49 rotates, vanes 59 are reciprocated radially by the co-action of rollers 61 and track 67. The outer end of each vane traces an arcuate path along part of which the vane is moving outward and during the rest of which the vane is moving inward toward shaft 47, i.e. is being retracted. The peak 69 (FIGS. 2 and 9) on track 67 in the vicinity of the second stage outlet B marks the end of the withdrawal path, i.e. the point where the vanes 59 are completely retracted to clear the inlet to the third-stage unit die 70.

Well W (FIG. 5) encloses the lower portion of vane drum 49 and housing 33 and, also, contains the compaction chamber 38. Chamber 38 comprises an arcuate-shaped channel section 37 (FIGS. 2, 3 and 5) located in the bottom of well W and extending from second-stage inlet A to the outlet B. The channel section (which measures 2" high by 4¼" wide in the preferred mode) forms the bottom and sides of the compaction chamber. The bottom surface of chamber 38 is shaped to match the withdrawal path of vanes 59, that is, the depth of chamber 38 diminishes or tapers in the direction of die 70 (FIG. 2). The ends of the vanes clear the bottom surface of chamber 38 by a small distance. A knife edge is located at 36. When vane drum 49 is in place, vanes 59 extend down into the compaction chamber and the drum shell 251 rides along the top edges of the channel forming the fourth side or top of the compaction chamber.

*Third-stage unit*

The third-stage unit comprises a die unit 70 (FIG. 2), which receives wafers from the second-stage unit and maintains the wafers under pressure and heat until they acquire a partial "set." The restriction imposed by die unit 70 can be removed to allow the wafers to be discharged from the waferizer. Three different control systems for operating die 70 to effect this restriction are described below.

Discharge die unit 70 (FIGS. 2, 4) comprises die 72 and housing 71. Die 72 is formed by side walls 73, which diverge slightly toward the die outlet, wall 74, which extends parallel to the path of wafer travel, and a lower wall 75, hinged at 76 to an extension 77 of the channel-shaped member 37. Lower wall 75 can swing in, so that it converges towards wall 74 toward the die outlet, or wall 75 can swing out, so that it diverges from wall 74 toward the die outlet. When wall 75 is in its inner or convergent position, the cross-sectional area of the die outlet is less than the cross-sectional area of the die inlet. The angle at which die 72 projects from housing 33 is a compromise between the best angle (tangential) for producing a flat wafer and the best angle (radial) for gradual retraction of the vanes 59 as they approach outlet B. The angle shown (FIG. 2) produces a relatively flat, wedge-shaped wafer yet allows a relatively smooth retraction of vanes 59.

For a wafer measuring about 4 inches wide by 2¼" high, a die having a length of eighteen inches and a taper for side walls 73 of a tenth of an inch per foot was found to be satisfactory. Other proportions may, of course, be used with the die to produce the friction needed to impart a "set" to the wafers.

A boss 78 on the top wall of the housing 71 supports pin 79, which provides a pivot for arms 80. The arms 80 support at their lower ends a pin 82 on which a roller 81 is rotatably mounted. A bracket 83 extends downward and an ear 84 extends upward from roller 81. Ear 84 is pivotally connected by pin 86 (FIG. 4) to pivot ears 85, depending from bottom wall 75 of die 72. An hydraulic cylinder device 87 is pivotally connected by pin 89 to support 89' on the lower end of die unit 70 and by a pin to bracket 83. Tube 72 is open at its upper end to discharge wafers to a conveyor 136 (FIG. 1).

An optional form of die 70 (FIGS. 12, 13) includes a knife 150 mounted on bottom wall 75. Cutting edge 151 of the knife slices each wafer in half, producing two halves each about 2" high by 2" wide and of variable thickness. Such smaller wafers move through the die more readily and, also, are more appealing to cows.

*Control systems*

Figures 10, 11:
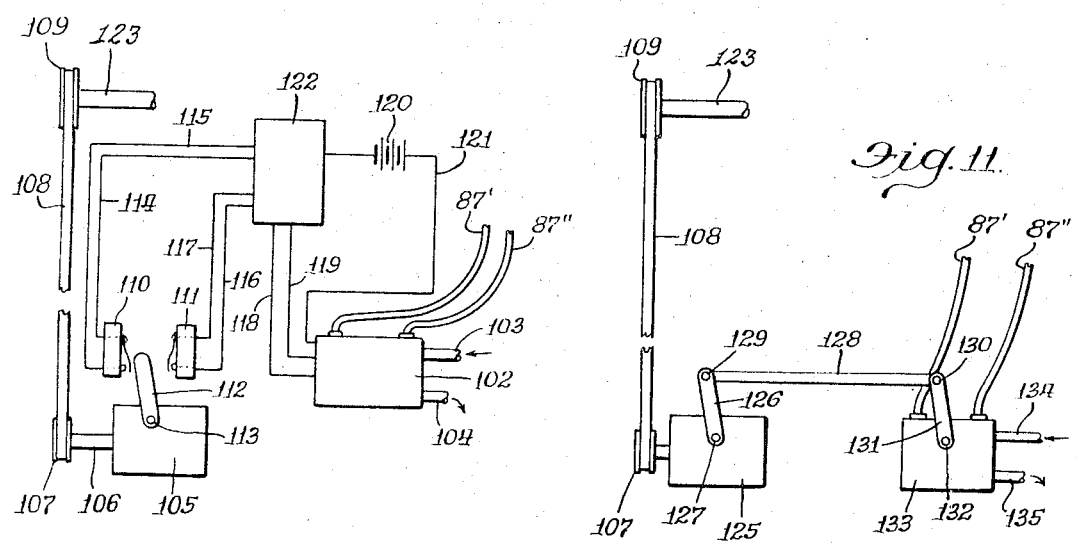
FIG. 10 is a diagram of a second form of control system for regulating the density of the wafers.
FIG. 11 is a diagram of a third form of control system for regulating the density of the wafers.

Different systems for controlling hydraulic device 87 may be used, three system being described here (FIGS. 2, 10, 11). Each system uses a four-way valve to control the flow of hydraulic fluid to and from the device 87 and operates in response to the hay density. The four-way valve has a hydraulic fluid supply line from a source of fluid under pressure (e.g. a tractor hydraulic system), a fluid return line to a fluid reservoir (e.g. a tractor hydraulic system), and a supply and return line from the valve to the opposite sides of the piston of hydraulic device 87.

The first control system (FIG. 2) comprises a pressure sensitive fluid element 93, a micro-switch 96, a battery 97, and a four-way solenoid valve 90. Element 93 comprises a fluid chamber 94 covered by a flexible diaphragm 94' and a plunger 95 for operating micro-switch 96 in response to pressure variations in fluid chamber 94. The flexibility of diaphragm 94' determines the hay density to which the control system reacts to open or close die 70. Electrical wiring 98, 99 and 100 connects the micro-switch, the battery and the solenoid valve, so that the latter valve is controlled by the micro-switch. Valve 90 is connected to a source of pressurized fluid by supply conduit 91, to a reservoir by return conduit 92, and to the device 87 by supply line 87' and return line 87".

Figure 14:
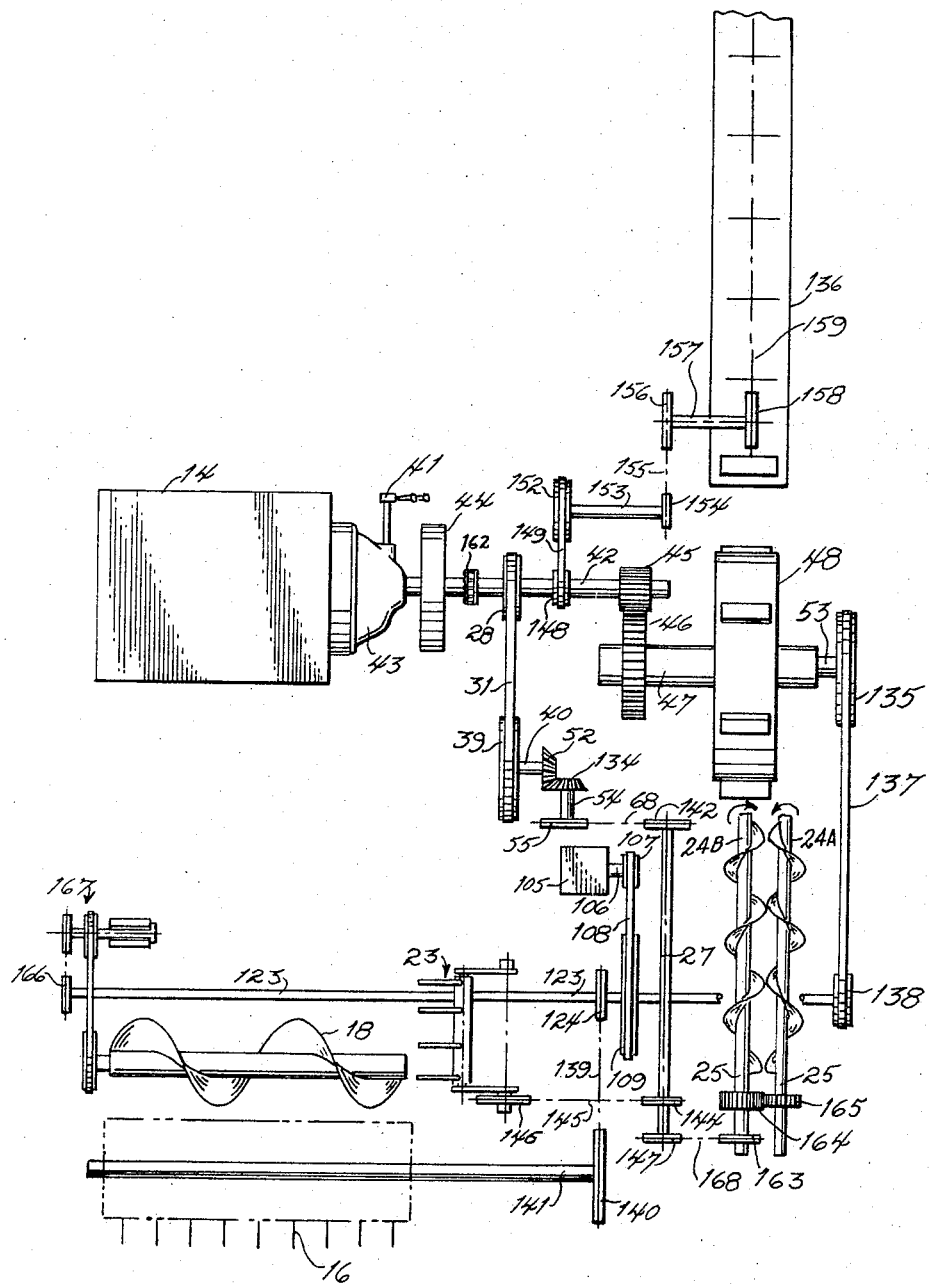
FIG. 14 is a diagram of the power train of the waferizer machine.

The second control system (FIG. 10) for operating hydraulic device 87 comprises a speed-responsive governor 105, micro-switches 110 and 111, relay 122, battery 120, and a four-way solenoid valve 102. Governor 105 is connected by pulley and belt system 106, 107, 108 and 109 to counter-shaft 123 (FIG. 14) of the hay pick-up mechanism 16 and the cross feed mechanism 18 (FIGS. 1 and 14). Governor arm 112, actuated by shaft 113, operates micro-switches 110 and 111. The switches are connected by wires 114, 115, 116 and 117 to relay 122, which controls valve 101. Relay 122 is connected to solenoid valve 101 by battery 120, and wires 121, 118 and 119. Valve 101 is connected to a source of pressurized fluid by supply conduit 103, to a reservoir by return conduit 104, and to the device 87 by supply line 87' and return line 87".

The third control system (FIG. 11) for operating hydraulic device 87 comprises speed responsive governor 125, linkage 128, and four-way valve 133. Governor 125 is connected by pulley and belt system 106, 107, 108 and 109 to counter shaft 123 (FIG. 14). Governor arm 126, actuated by shaft 127, operates control arm 131 of valve 133 by means of arm 128 and pins 129 and 130. Arm 131 operates valve 133 by rotating shaft 132, to vary the flow of hydraulic fluid. The valve is connected to a source of pressurized fluid by supply conduit 103, to a reservoir by return conduit 104, and to device 87 by supply line 87' and return line 87".

*Power train*

Power for driving the mechanical components of waferizing machine 10 is supplied by engine 14 (FIGS. 1 and 14) through shaft 42. The shaft 42 (FIG. 14) is connected to the engine by clutch 43, which is actuated by control lever 41. Spaced along shaft 42 are a conventional flywheel 44, a flexible coupling 162, pulleys 28 and 148, and pinion gear 45.

Pulley 28 (FIG. 14) supplies power to the packer finger assembly 23 and to the double auger unit 24. Thus, power is transmitted by pulley 28 to belt 31, which drives pulley 39 and its shaft 40 and associated bevel gear 52. Gear 52 in turn drives shaft 54 and its sprocket 55, which drives chain 68 and sprocket 142 on shaft 27. The shaft 27 carries sprockets 144 and 147. Sprocket 144 drives chain 145 and sprocket 146 of packer finger assembly 23. Sprocket 147 drives chain 168 and sprocket 163 on double auger shaft 25. Gear 164 on shaft 25 drives gear 165 on the shaft 25.

Pulley 148 (FIG. 14) on shaft 42 supplies power to the discharge conveyor 136. Power is transmitted first by pulley 148 to belt 149, then by the belt to pulley 152 and shaft 153, and then to sprocket 154, next by sprocket 154 to chain 155 and sprocket 156, and thus to shaft 157, and last by sprocket 158 on shaft 157 to the elevator chain 159.

Pinion 45 (FIG. 14) on shaft 42 transmits power to the second-stage, rotary vane unit 48, the third-stage control system of FIGS. 10 and 11, the hay pick-up mechanism 16, and the cross feed mechanism 18. A gear reduction of 28 to 1 is used with a 150 horsepower, 2800 r.p.m. engine. Thus, pinion 45 drives gear 46 on counter-shaft 47, rotation of shaft 47 operating the second stage unit 48 mounted thereon. Stub shaft 53 at the outer end of shaft 47 carries pulley 135, which rotates as part of shaft 47. Pulley 135 drives belt 137 and pulley 138 on shaft 123. Rotation of shaft 123 drives pulley 109 and sprockets 124 and 166 mounted thereon. Pulley 109 drives belt 108 and the speed governor of the control systems of FIGS. 10 and 11. Sprocket 124 drives chain 139, sprocket 140, and shaft 141 of the pick-up mechanism 16. Sprocket 166 drives the chain and belt system of the cross feed mechanism 18.

OPERATION

Waferizing machine 10 (FIG. 1) is connected by tongue 13 to a tractor and pulled along a windrow. Simultaneously, engine 14 drives the hay handling components of the waferizer. Hydraulic control fluid is obtained from the tractor hydraulic system.

As the waferizer advances along the windrow and cylinder 16 rotates, the tines pick hay up from the windrow and place it on platform 17. Auger 18 pushes the hay into the path of the packer finger 23'. These fingers then feed the hay into the first-stage, double auger unit 24.

The augers 24a, 24b (FIG. 2) draw the hay into the housing 20 and pack it to bale density. The high speed, continuous operation of the augers enables a large volume (e.g. from 2½ to 5 tons per hour) of hay to be handled, so that the bulk of the hay is reduced in quantities conducive to waferizing on a practical and economical scale. A steady stream of hay at bale density is, therefore, fed by the augers into the second-stage unit.

Hay at bale density moves into compaction chamber 38 of the second-stage unit between a pair of vanes 59 and fills the chamber between the vanes. As the second vane 59 of the pair passes knife edge 36, it cuts the hay and forms a wafer charge. Initially, there is no compaction of the hay trapped in the chamber between the pair of vanes. The hay merely moves along between the two vanes. When the forward vane is retracted by peak 69 on cam 67, the rear vane first moves the hay charge into the void left by the retracted vane and then begins its compacting action on the hay, packing it into the tapered region of chamber 38. Because of this delayed action of the vane in compacting the hay, pressure is applied to the hay in the second-stage over a relatively short arc only, thereby imposing but a slight drag and braking action on rotation of drum 49. In its present form, however, the wafer is capable of reexpanding, the inherent resiliency of the hay in the wafer accounting for this tendency. The hay of wafer shape and density is, therefore, forced into the third-stage die 72 for further processing.

The hay wafer is retained in die 70 and subjected to a prolonged pressure of about 5,000 to 8,000 pounds per square inch and to the heat of compression. This pressure and heat impart a set to the hay blades, the heat baking the hay sap to bond the hay together. As hay pressure in the die increases, two reactions occur. Diaphragm 94' (FIG. 2) is actuated by the higher pressure in the die and the speed of shaft 123 (FIG. 14) decreases because of the increased load imposed on vane drum 49 by the higher pressure in the die.

If the control system of FIG. 2 is being used, movement of diaphragm 94' causes valve 90 to supply pressurized fluid to the device 87, thereby moving bottom wall 75 out. If the control system of FIG. 10 is being used, a reduction in the speed of shaft 123 causes governor 105 (FIG. 10) to operate switch 110, relay 122 and valve 101, to supply pressurized fluid to the device 87 to move bottom wall 75 out. If the control system of FIG. 11 is being used, a reduction of speed of shaft 123 causes governor 125 to operate valve 133 to supply pressurized fluid to device 87 to move bottom wall 75 out. In any case, when pressurized fluid is applied to device 87, rod 88 moves inward and pulls plate 75 down to open die 70 and to reduce the drag on movement of wafers through it.

When the pressure in die 70 drops, a reverse controlling action occurs. Briefly, in the case of the system of FIG. 2, pressurized fluid is fed by valve 90 through line 87" to move the rod 88 outward to move wall 75 inward, fluid from the other side of device 87 being simultaneously bled to the reservoir through line 87'. In the control system of FIGS. 10–11, the speed of shaft 123 increases as the pressure (load) in die 70 decreases. Governor 105 (FIG. 10) operates micro-switch 110 to supply pressurized fluid to line 87" and to move rod 88 out to move bottom wall 75 inward. Governor 125 (FIG. 11) operates linkage 128 and valve arm 131 to cause the valve to supply pressurized fluid to line 87''', thereby causing rod 88 to move outward and move wall 75 inward.

This description covers only the preferred mode of the present invention. The invention is not limited to that mode but embraces, as well, all equivalent forms the fall within the spirit and scope of the attached claims. Specific details, where described, are given as illustrations only and are not to be construed as critical limitations.

The invention claimed is:

1. A three-stage machine for waferizing hay comprising a first-stage unit including auger means for compacting hay to bale density, said first-stage unit having a hay inlet and hay outlet; a second stage unit including a housing having an interior chamber, a vane drum rotatably mounted in said chamber, said vane drum and said chamber defining an elongate second-stage compaction zone, said zone having at its opposite ends an inlet communicating with said outlet of said first-stage unit and an outlet; a plurality of vanes in said vane drum, each of said vanes being movable through said zone on rotation of said vane drum and each of said vanes being movable radially with respect to said drum between an extended position and a retracted position; a third-stage unit including die means having an inlet aligned with said zone outlet for receiving wafers formed in said zone, said die means being dimensioned so that wafers passing therethrough frictionally engage said die means thereby generating sufficient heat to impart a "set" to said wafers.

2. A three-stage machine for waferizing hay as recited in claim 1 and further including means for radially moving said vanes from the fully extended position opposite said zone inlet to the fully retracted position opposite said zone outlet.

3. A three-stage machine for waferizing hay as recited in claim 1 wherein said die means comprises a die housing having a die tube extending therethrough, said tube having a movable portion pivotally connected to said housing, a fluid extensible device attached to said movable portion, a pressure sensing element in pressure communication with said die tube proximate said inlet thereof, said fluid extensible device movably responsive to said pressure sensing element to move said movable portion in response to pressure changes at said inlet of said die tube.

4. A three-stage machine for waferizing hay, as recited in claim 3, wherein: said third-stage unit includes a hydraulic valve for controlling the flow of hydraulic fluid to said fluid-extensible device, a source of pressurized fluid, a system of hydraulic conduits connecting said valve to said fluid source and to said extensible device, a pressure-sensing device located in said hollow die tube, and an electric circuit connecting said pressure-sensing device to said valve to control the flow of hydraulic fluid to and from said fluid-extensible device in response to variations in the pressure of the hay in said die tube.

5. A three-stage machine for waferizing hay, as recited in claim 3, wherein: said third-stage unit includes a hydraulic valve having a fluid connection to said fluid-extensible device, a source of pressurized fluid connected to said valve, a speed governor operatively connected to said second-stage rotary compacting means and responsive to changes in the speed of said second-stage rotary compacting means caused by variations in pressure in said third-stage die unit, and operating means connecting said governor to said valve to control the admission and exhaustion of fluid to said fluid-extensible device.

6. A three-stage machine for waferizing hay, as recited in claim 5, wherein said operating means connecting said governor to said valve comprises: mechanical linkage operated by said speed governor and connected to said hydraulic valve to operate said valve to control the admission and exhaustion of fluid to said fluid extensible device.

7. A three-stage machine for waferizing hay, as recited in claim 3, wherein: said vane drum rotates in sliding contact with said elongated compaction chamber section, an endless cam track is located adjacent said vane drum, each said vane includes guide means engaging said cam track, said cam track moving each said vane to its fully-extended position as it approaches said second-stage inlet and moving each said vane to a retracted position as it approaches said second-stage outlet; said die tube comprises a four-sided, elongated tube communicating with said second-stage wafer outlet, three sides of said tube being fixed, one of said tube sides projecting to a point adjacent said vane drum to form a terminal wall of said compaction chamber section, the fourth side of said tube being pivotal to effect a restriction on hay in said tube, said fluid-extensible device being joined to said fourth side.

(References on following page)

References Cited

UNITED STATES PATENTS

| | | | |
|---|---|---|---|
| 840,062 | 1/1907 | Hueg. | |
| 947,013 | 1/1910 | Dowd | 100—177 X |
| 1,045,184 | 11/1912 | Randleman | 100—145 |
| 1,788,330 | 1/1931 | Ross | 107—15 |
| 2,052,449 | 8/1936 | Connell | 107—8 |
| 2,498,029 | 2/1950 | Clerc | 230—152 |
| 2,582,672 | 1/1952 | Bobst | 100—43 |
| 2,708,872 | 5/1955 | Lauck | 100—192 X |
| 3,009,413 | 11/1961 | Alexander et al. | 100—218 |
| 3,050,771 | 8/1962 | Mylchreest | 17—41 |
| 3,063,361 | 11/1962 | Gehrke | 100—98 |
| 3,090,182 | 5/1963 | Johnson et al. | 56—1 |
| 3,168,057 | 2/1965 | Bliss | 107—14 |

FOREIGN PATENTS

| | | |
|---|---|---|
| 27,668 | 9/1932 | Netherlands. |

LOUIS O. MAASSEL, *Primary Examiner.*